1

2,770,545

STABILIZATION OF ORGANIC COMPOUNDS

Ralph B. Thompson, Hinsdale, Ill., assignor to Universal Oil Products Company, Des Plaines, Ill., a corporation of Delaware No Drawing. Application October 2, 1953, Serial No. 383,937

20 Claims. (Cl. 99—163)

This invention relates to the stabilization of organic compounds which tend to deteriorate in storage, during treatment and/or in use.

The novel method of the present invention is particularly applicable to the stabilization of fatty materials including edible fats and oils which may be of animal, vegetable or mineral origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other fats and oils may be treated in accordance with the present invention, including oils and fats which previously have been subjected to various treatments such as hydrogenation, blowing with air, heat treatment, etc. It is also understood that the fatty material may be used for inedible purposes, such as greases, lubricating oil, etc., and also that the fatty material may comprise solid food products including, for example, beef cuts, bacon, ham, fish, fruit, vegetable, etc., as well as forage crops in the field or after cutting.

As will be hereinafter set forth in detail, the novel additive of the present invention functions both as an antioxidant and as a metal deactivator. The additive is particularly advantageous for use in organic materials subject to oxidative deterioration and containing metallic impurities which catalyze deterioration thereof. Thus the present invention is particularly applicable to the treatment of vegetable oils. For example, a particular problem in the stabilization of soya bean oil is reversion which is believed to be catalyzed by metallic impurities.

It is understood that the invention may be utilized for the stabilization of other organic materials which tend to deteriorate in storage and/or during treatment or use. Typical illustrations of such other organic materials subject to deterioration include motor fuel, diesel oil, mineral oil, lubricating oil, fuel oil, drying oil, greases, paraffin waxes, rubber, monomers including styrene, butadiene, isoprene, acetylenes, etc., various unsaturated alcohols, acids, ketones, etc.

In one embodiment, the present invention relates to a method of stabilizing an organic material against deterioration which comprises incorporating therein a stabilizing amount of a purpurogallin compound.

In a specific embodiment, the present invention relates to a method of stabilizing a fatty material which comprises incorporating therein from about 0.0001% to about 1% by weight of purpurogallin.

In another embodiment the present invention comprises or organic material subject to deterioration, containing an additive to retard said deterioration, a stabilizing amount of a purpurogallin compound.

As hereinbefore set forth, the novel additive of the present invention comprises a purpurogallin compound.

2

Purpurogallin may be represented by the following general formula:

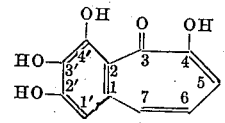

The purpurogallin compound for use in accordance with the present invention may comprise purpurogallin and/or derivatives thereof. The derivatives include purpurogallin having nuclear substitution or substitutions on 6 and/or 7 membered rings with hydrocarbon groups including alkyl, aralkyl, aryl, alkaryl, cycloalkyl, etc. radicals. In another embodiment the purpurogallin compound comprises ester derivatives thereof. In still another embodiment the purpurogallin compound may comprise partially hydrogenated derivatives thereof.

Representative compounds of the alkyl substituted derivatives include 1'-methylpurpurogallin, 1'-ethylpurpurogallin, 1'-propylpurpurogallin, 1'-butylpurpurogallin, 1'-amylpurpurogallin, 1'-hexylpurpurogallin, 1'-heptylpurpurogallin, 1'-octylpurpurogallin, etc., 5-methylpurpurogallin, 5-ethylpurpurogallin, 5-propylpurpurogallin, 5-butylpurpurogallin, 5-amylpurpurogallin, 5-hexylpurpurogallin, 5-heptylpurpurogallin, 5-octylpurpurogallin, etc., 6-methylpurpurogallin, 6-ethylpurpurogallin, 6-propylpurpurogallin, 6-butylpurpurogallin, 6-amylpurpurogallin, 6-hexylpurpurogallin, 6-heptylpurpurogallin, 6-octylpurpurogallin, etc., 7-methylpurpurogallin, 7-ethylpurpurogallin, 7-propylpurpurogallin, 7-butylpurpurogallin, 7-amylpurpurogallin, 7-hexypurpurogallin, 7-heptylpurpurogallin, 7-octylpurpurogallin, etc., 1'5-dimethylpurpurogallin, 1'5-diethylpurpurogallin, 1'5-dipropylpurpurogallin, 1'5-dibutylpurpurogallin, 1'5-diamylpurpurogallin, 1'5-dihexylpurpurogallin, 1'5-diheptylpurpurogallin, 1'5-dioctylpurpurogallin, etc., 1'6-dimethylpurpurogallin, 1'6-diethylpurpurogallin, 1'6-dipropylpurpurogallin, 1'6-dibutylpurpurogallin, 1'6-diamylpurpurogallin, 1'6-dihexylpurpurogallin, 1'6-diheptylpurpurogallin, 1'6-dioctylpurpurogallin, etc., 1'7-dimethylpurpogallin, 1'7-diethylpurpurogallin, 1'7-dipropylpurpurogallin, 1'7-dibutylpurpurogallin, 1'7-diamylpurpurogallin, 1'7-dihexylpurpurogallin, 1'7-diheptylpurpurogallin, 1'7-dioctylpurpurogallin, etc., 5,6-dimethylpurpurogallin, 5,6-diethylpurpurogallin, 5,6-dipropylpurpurogallin, 5,6-dibutylpurpurogallin, 5,6-diamylpurpurogallin, 5,6-dihexylpurpurogallin, 5,6-diheptylpurpurogallin, 5,6-dioctylpurpurogallin, etc., 5,7-dimethylpurpurogallin, 5,7-diethylpurpurogallin, 5,7-dipropylpurpurogallin, 5,7-dibutylpurpurogallin, 5,7-diamylpurpurogallin, 5,7-dihexylpurpurogallin, 5,7-diheptylpurpurogallin, 5,7-dioctylpurpurogallin, etc., 6,7-dimethylpurpurogallin, 6,7-diethylpurpurogallin, 6,7-dipropylpurpurogallin, 6,7-dibutylpurpurogallin, 6,7-diamylpurpurogallin, 6,7-dihexylpurpurogallin, 6,7-diheptylpurpurogallin, 6,7-dioctylpurpurogallin, etc., and similarly substituted compounds in which the alkyl groups are different but are selected from alkyl radicals containing from 1 to 8 or more carbon atoms per group. Other derivatives include those in which the substituent or substituents are selected from aralkyl, aryl, alkaryl, cycloaryl, heterocyclic, etc. radicals. It is understood that the substituents may be different and thus include compounds having one or more alkyl and one or more cycloalkyl substituents, one or more alkyl and one or more aryl substituents, one or more aryl and one or more cycloalkyl substituents, etc.

As hereinbefore set forth, in another embodiment the purpurogallin compound comprises carboxylic acid esters thereof. Representative specific compounds in this class include purpurogallin carboxylic acid methyl ester, purpurogallin carboxylic acid ethyl ester, purpurogallin carboxylic acid propyl ester, purpurogallin carboxylic acid butyl ester, purpurogallin carboxylic acid amyl ester, purpurogallin carboxylic acid hexyl ester, purpurogallin carboxylic acid heptyl ester, purpurogallin carboxylic acid octyl ester, etc. In another embodiment the aryl esters may be employed including such compounds as purpurogallin carboxylic acid phenyl ester, purpurogallin carboxylic acid tolyl ester, purpuragallin carboxylic acid xylyl ester, etc. In still another embodiment, the compounds may comprise purpurogallin carboxylic acid esters in which the carboxylic acid group is selected from acetic acid, propionic acid, butyric acid, etc. and include such compounds as purpurogallin acetic acid methyl ester, purpurogallin acetic acid ethyl ester, purpurogallin acetic acid propyl ester, purpurogallin acetic acid butyl ester, purpurogallin acetic acid amyl ester, etc., purpurogallin propionic acid methyl ester, purpurogallin propionic acid ethyl ester, purpurogallin propionic acid propyl ester, purpurogallin propionic acid butyl ester, purpurogallin propionic acid amyl ester, etc., purpurogallin butyric acid methyl ester, purpurogallin butyric acid ethyl ester, purpurogallin butyric acid propyl ester, purpurogallin butyric acid butyl ester, purpurogallin butyric acid amyl ester, etc., while in other cases the derivative may comprise an aryl ester.

In still another embodiment the purpurogallin compound may comprise a partially hydrogenated derivative and particularly tetrahydropurpurogallin. It is understood that the hydrogenated derivative may contain substituents of the same type as hereinbefore set forth.

It is understood that many compounds may be prepared and used in accordance with the present invention and two or more of these compounds may be used in conjunction with each other and/or with other additives. Furthermore, it is understood that the various compounds are not necessarily equivalent in their activity, either in the same substrate or in different substrates. However, all of these compounds will serve to retard deterioration of certain organic compounds.

The purpurogallin compounds may be prepared in any suitable manner. In one method, purpurogallin may be prepared by oxidizing pyrogallol with aqueous sodium iodate. Further details as to this preparation are reported in the paper by Haworth, Moore and Pauson, J. Chem. Soc., 1948, 1049. Preparation of purpurogallin carboxylic acid methyl ester is described in the paper by Craw and Haworth, J. Chem. Soc., 1951, 1326. The preparation of tetrahydropurpurogallin is described in the paper by Haworth, Moore and Pauson referred to above.

The additive of the present invention generally is incorporated in the organic material to be stabilized in an amount of below about 1% by weight and preferably in an amount within the range of from about 0.0001% to about 1% by weight.

It is understood that the additive may be used along with other additives which are incorporated in the organic material for specific purposes. For example, when treating edible fats and oils, the inhibitor may be utilized in conjunction with various synergists, metal deactivators, etc., including citric acid, phosphoric acid, ascorbic acid, etc., and/or in combination with other inhibitors. When used in gasoline, the additive may be used in conjunction with various dyes, synergists, antiknock agents, rust inhibitors, etc. The additive of the present invention may be utilized as such or in a suitable solvent, including alcohols, glycols, ethers, ketones, etc. When desired, the additive may be marketed as a solution alone or in admixture with other additives. In still another embodiment the additive may be prepared as an aqueous solution, an emulsifying agent being used when desired, and thus utilized as a spray for food products or other solid organic materials.

As hereinbefore set forth, the additive of the present invention also functions as a metal deactivator. Therefore, in another embodiment of the invention, the additive may be used in conjunction with a well-known antioxidant, the latter usually comprising phenolic or aromatic amine compounds, depending upon the particular organic material being treated. For example, in the treatment of food products, suitable antioxidants include butylated hydroxyanisole, 2,6-ditertiary-butyl-4-methylphenol, tocopherol, nordihydroguaiaretic acid, etc., and these may be used in conjunction with the additive of the present invention. When used in hydrocarbon distillates, the antioxidant may comprise N,N'-di-sec-butyl-p-phenylene diamine, N-n-butyl-p-aminophenol, 2,6-ditertiary-butyl-4-methylphenol, 2,4-dimethyl-6-tertiary-butylphenol, etc., and these may be used in conjunction with the additive of the present invention.

The following examples are introduced to illustrate further the novelty and utility of the present invention but not with the intention of unduly limiting the same.

*Example I*

Purpurogallin was utilized in a concentration of 0.02% by weight to stabilize a commercial lard having a Schaal Oven time of 8 days. The Schaal Oven test is a standard method of determining stability of fats and oils. The Schaal Oven time of the lard containing the purpurogallin was increased to 48 days.

It is thus seen that purpurogallin served to considerably improve the stability of the lard.

*Example II*

As hereinbefore set forth, purpurogallin also functions as a metal deactivator. A 3" coil of No. 18 copper wire was added to a sample of the lard and this served to reduce the Schaal Oven stability from 8 days to 1 day. In another sample of the same lard containing copper wire and 0.02% by weight of purpurogallin, the Schaal Oven time was increased to 46 days.

It will be noted that purpurogallin served to offset the deleterious effect of the copper.

*Example III*

The lard used in this example had a Schaal Oven time of 5 days in the absence of copper and of 2 days in the presence of copper. 0.02% by weight of 1'5-diethylpurpurogallin served to increase the Schaal Oven time to 25 days in the absence of copper and to 22 days in the presence of copper.

*Example IV*

Purpurogallin carboxylic acid n-propyl ester was added in a concentration of 0.02% by weight to another sample of the lard described in Example III. This additive served to increase the Schaal Oven time to 39 days in the absence of copper and to 29 days in the presence of copper.

*Example V*

Tetrahydropurpurogallin when added in a concentration of 0.02% by weight to another sample of the lard described in Example III served to increase the Schaal Oven time to 48 days in the absence of copper and to 19 days in the presence of copper, as compared to the Schaal Oven time of 5 and 2 days, respectively, in the absence of additive.

*Example VI*

An additive composition comprising ethylated purpurogallin was prepared by reacting pyrogallol and 4-ethylpyrogallol with potassium iodate. The product was filtered, water washed, dried and recrystallized from dilute methanol. The product had a melting point of 145–148° C. This product is believed to comprise a mixture of unalkylated, monoethylated and diethylated purpurogallin. This example illustrates that a mixture of the purpurogallin compounds may be used in accordance with the present invention.

0.02% by weight of the ethylated purpurogallin product was added to other samples of the lard described in Example III and served to increase the Schaal Oven time to 33 days in the absence of copper and to 22 days in the presence of copper.

*Example VII*

Purpurogallin carboxylic acid methyl ester was utilized as an additive in cracked gasoline having an induction period of 100 min. 0.05% by weight of the additive was incorporated in the gasoline and served to increase the induction period to 575 min.

I claim as my invention:

1. Method of stabilizing an organic material against oxidative deterioration which comprises incorporating therein a purpurogallin compound.

2. Method of stabilizing an organic material against oxidative deterioration which comprises incorporating therein a stabilizing amount of purpurogallin.

3. Method of stabilizing an organic material against oxidative deterioration which comprises incorporating therein a stabilizing amount of purpurogallin carboxylic acid alkyl ester.

4. Method of stabilizing an organic material against oxidative deterioration which comprises incorporating therein a stabilizing amount of alkylated purpurogallin.

5. Method of stabilizing an organic material against oxidative deterioration which comprises incorporating therein a stabilizing amount of hydrogenated purpurogallin.

6. Organic material subject to oxidative deterioration in storage containing, as an additive to retard said deterioration, a stabilizing amount of a purpurogallin compound.

7. Organic material subject to oxidative deterioration in storage containing, as an additive to retard said deterioration, a stabilizing amount of purpurogallin.

8. Organic material subject to oxidative deterioration in storage containing, as an additive to retard said deterioration, a stabilizing amount of purpurogallin carboxylic acid alkyl ester.

9. Organic material subject to oxidative deterioration in storage containing, as an additive to retard said deterioration, a stabilizing amount of purpurogallin carboxylic acid aryl ester.

10. Organic material subject to oxidative deterioration in storage containing, as an additive to retard said deterioration, a stabilizing amount of alkylated purpurogallin.

11. Organic material subject to oxidative deterioration in storage containing, as an additive to retard said deterioration, a stabilizing amount of aryl substituted purpurogallin.

12. Organic material subject to oxidative deterioration in storage containing, as an additive to retard said deterioration, a stabilizing amount of hydrogenated purpurogallin.

13. Fatty material tending to become rancid containing from about 0.0001% to about 1% by weight of a purpurogallin compound.

14. Lard normally tending to deteriorate in storage containing from about 0.0001% to about 1% by weight of purpurogallin.

15. Vegetable oil tending to deteriorate in storage containing from about 0.0001% to about 1% by weight of a purpurogallin compound.

16. Vegetable oil tending to deteriorate in storage containing from about 0.0001% to about 1% by weight of purpurogallin.

17. Vegetable oil tending to deteriorate in storage containing from about 0.0001% to about 1% by weight of purpurogallin carboxylic acid alkyl ester.

18. Vegetable oil tending to deteriorate in storage containing from about 0.0001% to about 1% by weight of tetrahydropurpurogallin.

19. Hydrocarbon subject to deterioration containing from about 0.0001% to about 1% by weight of a purpurogallin compound.

20. Cracked gasoline tending to deteriorate in storage containing from about 0.0001% to about 1% by weight of a purpurogallin compound.

No references cited.